United States Patent
Parisel et al.

(10) Patent No.: US 6,381,451 B1
(45) Date of Patent: Apr. 30, 2002

(54) METHOD OF RECEIVING VOICE SIGNALS BY A MOBILE TELEPHONE

(75) Inventors: Arnaud Parisel, Paris; Xavier Dugast, Chatou, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/448,418

(22) Filed: Nov. 23, 1999

(30) Foreign Application Priority Data

Nov. 26, 1998 (FR) .......................................... 98 14877

(51) Int. Cl.[7] .............................................. H04B 1/16
(52) U.S. Cl. ...................... 455/343; 455/574; 455/38.3; 455/67.3; 370/311
(58) Field of Search .............................. 455/422, 38.3, 455/574, 343, 418, 67.1, 67.3; 370/311, 342, 337

(56) References Cited

U.S. PATENT DOCUMENTS

| | | | | |
|---|---|---|---|---|
| 4,756,007 A | * | 7/1988 | Qureshi et al. ............... | 375/37 |
| 5,239,557 A | * | 8/1993 | Dent .......................... | 455/343 |
| 5,570,369 A | * | 10/1996 | Jokinen ..................... | 370/95.3 |
| 5,815,507 A | * | 9/1998 | Vinggaard et al. ........... | 371/5.1 |
| 5,930,706 A | * | 7/1999 | Raith .......................... | 455/422 |
| 5,978,366 A | * | 11/1999 | Massingill et al. ......... | 370/337 |
| 6,029,268 A | * | 2/2000 | Kong .......................... | 714/795 |

FOREIGN PATENT DOCUMENTS

| | | |
|---|---|---|
| DE | 4216911 A1 | 11/1992 |
| EP | 0715481 A1 | 6/1996 |
| WO | WO 98/13949 | 4/1998 |

* cited by examiner

*Primary Examiner*—Vivian Chin
*Assistant Examiner*—Duc Nguyen
(74) *Attorney, Agent, or Firm*—Sughrue Mion, PLLC

(57) ABSTRACT

To save energy and to increase the standby time and talk time of a mobile telephone, the activity of the mobile telephone is segmented, even during standby periods, and activation is allowed to occur only if the reception quality of signaling surrounding the standby condition is sufficient. When the mobile telephone is on standby, given the redundancy of the activation signaling, only some of the signals are listened to in order to decide whether it is necessary to listen to the others and to activate the mobile telephone. When the mobile telephone is communicating and the other party is silent, the energy consumed in receiving and above all in decoding the received signals is reduced by eliminating demodulated signals of too poor quality.

5 Claims, 3 Drawing Sheets

METHOD OF RECEIVING VOICE SIGNALS BY A MOBILE TELEPHONE

The present invention consists in a method of receiving voice signals transmitted by a base station to a mobile telephone, in particular a GSM mobile telephone. It is directed mainly to reducing the power consumption of mobile telephones when they are communicating but the other party is silent.

BACKGROUND OF THE INVENTION

In the field of mobile telephones, the ability of a telephone to remain on standby or available for a long time period is essentially conditioned by the energy stored in its battery and by its power consumption. Because only limited energy can be stored in the battery, power saving is assured essentially by choosing low-dissipation components and by placing the mobile telephone on standby as often as possible. In standby mode, the power supply is disconnected from ancillary circuits of the mobile telephone. These ancillary circuits essentially comprise the keypad, screen, transmitter, and receiver. Also, the clock frequency of the microprocessor controlling the mobile telephone is reduced, typically from a few MHz to a few tens of kHz, which significantly reduces power consumption. The reduction is insufficient, however.

Mobile telephones available at present have a standby time in the range from around sixty hours to around one hundred hours. The talk time when the mobile telephone is transmitting and moving around is much shorter. In both cases the mobile telephone must nevertheless be available to receive speech signals or signaling. When the mobile telephone is on standby (not communicating), it must be able to receive signaling from a base station to advise it of an incoming call, i.e. that someone is attempting to call it. The mobile telephone must therefore be able regularly to receive signaling which tells it, firstly, at which agreed time information on a possible connection will next be sent to it and, secondly, whether it is currently being called by another party, so that it can begin to communicate immediately. The electrical power consumed in receiving such signaling limits the standby time referred to above.

This problem is solved by the technical solution described in patent application WO 98/13949, for example, in which advantage is taken of the highly redundant nature of the signaling by receiving only some of the signaling in a favorable situation and thereby placing the mobile telephone on standby for a long period of time.

During the call phase, the telephone may not need to transmit. However, whether it is transmitting or not, the mobile telephone must listen at all times for speech signals from the other party. The other party may be silent for a short while. It is estimated that in a normal call a mobile telephone transmits only half the time. The mobile telephone must be able to listen throughout the call, however. If the other party is silent while listening, and possibly even when the mobile telephone is itself transmitting, it is necessary to limit the power consumption associated with listening while the other party is silent.

In the discontinuous transmission (DTX) technique, which is well known in the art, the base station communicating with the mobile telephone transmits SID (Silence Identification Data) signaling corresponding to this situation. It may be feasible to use these SID signals to switch the mobile telephone to the standby mode, with low power consumption in receive mode, until SID signals are received again. However, this approach is not practicable because the other party may resume conversation with the mobile telephone at any time. In the final analysis, it is therefore necessary to listen between receiving SID signals to determine if the other party has started to speak again. This increases power consumption.

Given that the reduction in power consumption achieved so far has been insufficient, the invention seeks to reduce it further. The starting point is the realization that the information to be sent to a mobile telephone is coded in given-length blocks of bits. The bits of these blocks of bits are distributed across a plurality of windows in a plurality of successive frames to be routed to their destination.

In accordance with the invention, under these conditions, the choice is made to receive, in a first frame, speech signals or signaling transmitted in a first time window during the first frame. Receiving them involves demodulating them and possibly decoding them and in this case therefore entails activating the entire receive sub-system. This sub-system includes one or more voltage-controlled oscillators for receiving and demodulating received signals in baseband. The receive sub-system also includes a processor for decoding the bits received, in particular a Viterbi decoder. In accordance with the invention, the decoding is performed only if the demodulation is correct. Where applicable, this saves the non-negligible energy required to start the processor. Once this has been accomplished for signaling of at least a first time window, its meaning is considered. Before the next time window arrives, in principle in the same relative position in the next frame, the mobile telephone is or is not configured to receive the corresponding second speech signals or signaling.

Of course, when they are not received, neither demodulation nor processing is activated, which achieves a substantial energy saving.

OBJECT AND SUMMARY OF THE INVENTION

The invention therefore consists in a method of receiving voice signals in a mobile telephone wherein said voice signals are divided into time windows in successive frames, said method including the following ordered steps:

first voice signals corresponding to a first time window are received, the quality of the received signals is measured and compared to a first threshold, and the mobile telephone is selectively configured to receive second voice signals corresponding to a second time window as a function of the quality information.

If necessary, the same processing is performed for a subsequent time window.

BRIEF DESCRIPTION OF THE DRAWINGS

The invention will be better understood on reading the following description and examining the accompanying drawings, which are given by way of example only and are in no way limiting on the invention. In the figures.

MORE DETAILED DESCRIPTION

Figure 1:
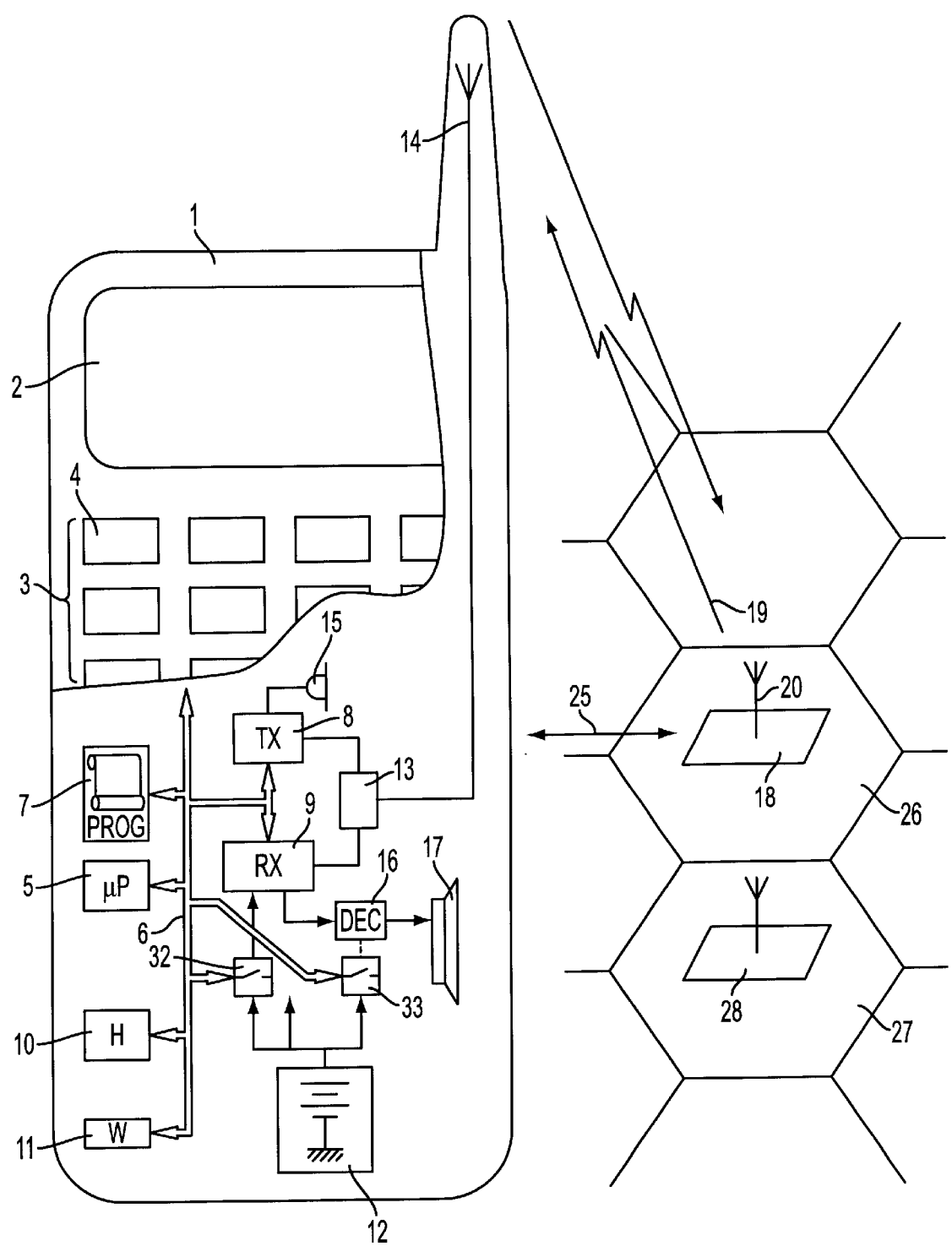
FIG. 1 shows a mobile telephone provided with means for implementing the method of the invention.

FIG. 1 shows a mobile telephone 1 which can be used to implement the method of the invention. In the manner that is well-known in the art, it essentially includes, in a casing, a screen 2 and a keypad 3 with buttons 4 for operating the mobile telephone as required. From the functional point of view, the mobile telephone includes an electronic circuit including a microprocessor 5 connected by a data, address and control bus 6 to the screen 2, the keypad 3, a program store 7, transmit circuits 8 and receive circuits 9. From the practical point of view, the bus 6 is also connected to a clock 10 and to a scratchpad 11, for example a static or dynamic memory. A power supply 12 supplies electrical power to the various circuits. It consists of the battery of the mobile telephone. It is the battery that limits the standby time and talk time of the mobile telephone.

When transmitting or receiving, the circuits 8 and 9 are connected via a duplexer 13 to a transmit-receiver antenna 14. The transmit circuits receive the signals to be transmitted from a microphone 15. The receive circuits are connected to a receive decoder 16 connected to a loudspeaker 17. The microphone 15 and the loudspeaker 17 are shown symbolically here. The mobile telephone can be used to send faxes, or even data if it is connected to a microcomputer. In this case, the microphone 15 and the loudspeaker 17 are replaced by an interface, not shown, between the mobile telephone and the microcomputer. The microprocessor 5 also controls this interface via the bus 6. The above description is merely one example of the functional architecture of a mobile telephone. Others are feasible. In particular, not all mobile telephones have the duplexer, some using filters instead.

The mobile telephone 1 communicates with a base station 18 of a mobile telephone network managed by an operator. Where the invention is concerned, the base station 18 sends voice signals and/or signaling 19 to the mobile telephone. The invention processes the signals 19 in a particular manner in order to reduce power consumption.

Figure 2:
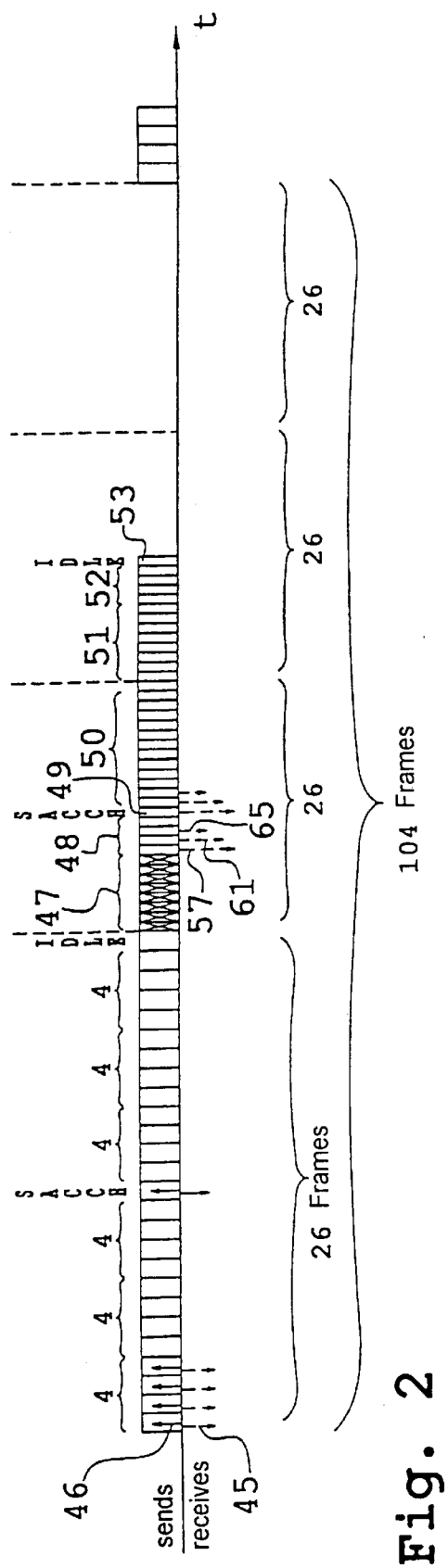
FIG. 2 is a timing diagram of voice signals exchanged between a base station and a mobile telephone and which are used in the invention.

FIG. 2 shows the protocol adopted to deal with periods of silence when the mobile telephone is communicating. Signals transmitted on a BCCH (Broadcast Control Channel) have previously allocated a time window 45 in each frame to the link between a mobile telephone 1 and a base station 18 and the mobile telephone receives voice (or other) signals from the base station. A time window 46 in the same frame as the time window 45 and offset by two time windows enables the mobile telephone to transmit voice (or other) signals to the base station.

FIG. 2 shows in dashed line signals received during window 45 and in continuous line signals transmitted during window 46 in the same frame. The power saving on transmission is immediate if the user of the mobile telephone is not speaking. In this case, the time windows 46 do not give rise to any transmission.

In contrast, for the time windows 45 corresponding to reception, even if the other party is not speaking, the mobile telephone must be activated and listen to windows 45 in each frame to detect possible resumption of dialogue by the other party.

This listening during time windows 45 is also costly in energy terms, even though in this case the cost is lower than that of the permanent standby condition.

The invention takes advantage of the fact that the transmitted voice signals are coded in blocks and distributed over four time windows in four successive frames. The DTX protocol well-known in the art adopts a period of 104 frames divided into four groups each of 26 frames and is used when the other party is silent. Each group includes a sub-group 47 of eight successive frames used to send SID signals which enable the mobile telephone (which is obliged to receive them) to switch to a corresponding mode of operation, i.e. to a power saving mode in particular. The protocol also includes a subgroup 48 of four successive frames for conveying voice signals but which in practice do not convey anything if the sender on the link is silent. Sub-group 48 is followed by a time window in a SACCH (Slow Associated Control Channel) frame during which the base station provides the mobile telephone with a list of adjoining base stations 28 that the mobile telephone must monitor. During the same time window the mobile telephone sends the base station its previous measurements concerning the adjoining base stations. The measurements are essentially measured values of the received signal level.

Three sub-groups of frames 50 to 52 of the same type as sub-group 48 follow the SACCH time window 49. The invention concerns itself with what occurs during reception of the time windows of the sub-groups of frames 48, 50, 51 and 52. A group of 26 frames is terminated by a time window in an IDLE frame 53. During the time window of the frame 53, the mobile telephone seeks FCH, SCH signals from adjoining base stations, sending the results during time window 49.

Figure 3:
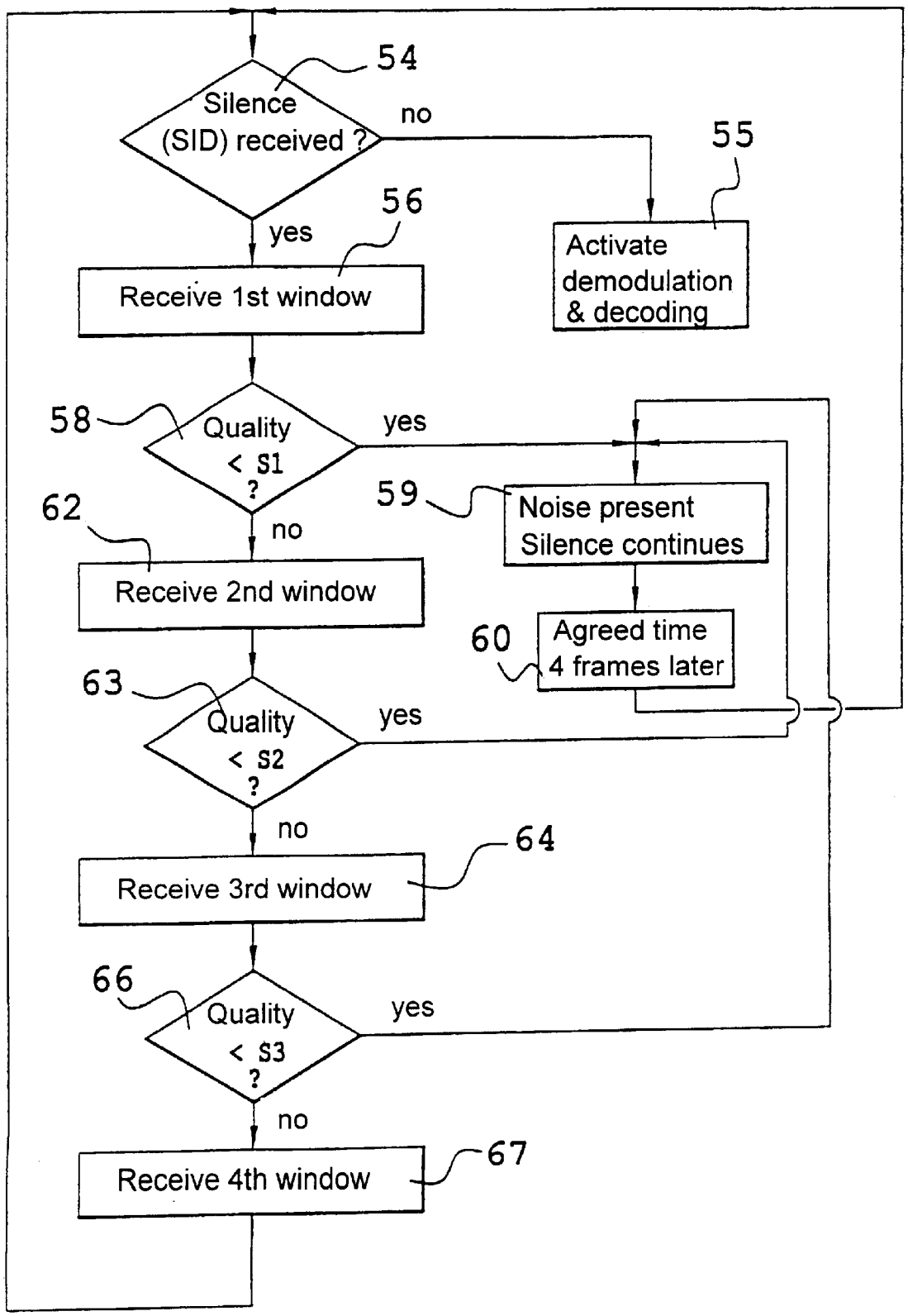
FIG. 3 is a flowchart of the steps of the method of the invention.

FIG. 3 shows a specific embodiment of the method of the invention when the mobile telephone is communicating but the other party, transmitting from the base station 18, is not sending signals. In the method of the invention, a first test 54 seeks to determine if SID signals are received. If not, the call is in progress and in this case demodulation and decoding are activated (step 55), and in particular the corresponding symbolic switches 32 and 33 are closed. On the other hand, if SID signals have been received, in each of time window sub-groups 48, 50, 51 and 52 the mobile telephone seeks to receive coded signals representative of transmitted voice, but only if the coded signals have a meaning. With this aim in view, during a first step 56, the mobile telephone receives and possibly demodulates and decodes the signals of a first window 57 (sub-group 48). The quality of the signal received is then compared to a first threshold Si (test 58). If the quality is below the threshold Si, this is indicative of noise. The conditions of silence, essentially the power saving conditions involving the switches 32 and 33, are then maintained during step 59. In this case the switch 32 is open (whereas the switch 33 may not have been closed, and remains open). Also, because the signal level has been found to be insufficient, a decision is taken to set an agreed time four time windows later (step 60). In practice, this will be case only to change from sub-group 50 to sub-group 51 and from sub-group 51 to sub-group 52. In contrast, the rendezvous will be set five frames later for the change from sub-group 48 to sub-group 50 and thirteen frames later for the change from sub-group 52 to sub-group 48.

On the other hand, if the signal quality is not so bad, it is not certain that noise is present. Under these conditions, it is necessary to organize the reception of a second window 61 in the same sub-group (sub-group 48) as the window 57. The signals of the window 61 are received and possibly demodulated and decoded and their quality is compared to a second threshold S2 during a test 63. Under the same conditions as previously, and depending on the result of the test 63, the decision is taken to move on to step 59 and step 60 (the latter being modified in terms of the rendezvous waiting time). Otherwise, if the quality of the signal is above the threshold 52, the decision is taken to move on to a step 64 for receiving the third window 65. As previously, the signals from this third window are compared with a threshold S3 (test 66) and a decision is taken in step 67 whether to receive the signals corresponding to the fourth window of the block concerned or not.

Because of this approach, if the other party is not transmitting, the received signal is noise and steps 59 and 60 switch the mobile telephone to the standby state until the next group is received. A major power saving is then achieved because the power consumption is only one quarter of the monitoring power consumption when the mobile telephone is communicating (incurred by using the listening mode).

The comparison thresholds S1, S2, S3 and the thresholds of steps 36 and 42 can be determined in various ways. The preferred way is to quantify the received signals, when they are demodulated, on more than two bits, typically on eight bits. Although such signals are deemed-to represent only binary symbols, this is a particularly efficient way to introduce the performance of the Viterbi algorithm in order to achieve exact decoding of the received signals. The Viterbi algorithm of itself produces a bit error rate that can be used as a measurement of the quality of the received signal if the decision is taken to decode the signal. This bit error rate can then be compared to a threshold rate S1, S2 or S3. Viterbi decoding with the received symbols quantized on eight bits and on two bits can also be compared. The comparison is applied to the results of the two decoding processes. This determines the quality of the signal. Other methods are well-known in the art.

With regard to the mode of communication, a threshold S1 less than or equal to the threshold 92 which is itself less than or equal to the threshold S3 is preferably chosen. If the results from the first window 57 are very bad, then this certainly represents noise-and it is not necessary to listen to a subsequent time window. In contrast, if the results are above the threshold but insufficient to lead to correct decoding, they are combined with the results of decoding the time window 61. In this case, because with the Viterbi algorithm it is possible to access a combined measurement that is more accurate because the received bit stream is much greater, the criterion determining whether or not to continue to receive and decode subsequent time windows can be less severe. The same of course applies to the third time window 65 for which the threshold S3 is not a threshold relating only to the quality of the signal of the third window but also to the quality of the signal resulting from the combination of the three windows 57, 61 and 65.

The quality of the signal can also be measured by comparing the bit error rate resulting from reception of the SID signals, which have to be received and decoded, with the quality of the signals received during time window 57. If it was difficult to receive the SID signals, the channel itself can be deemed to be affected by noise, in which case the values of the thresholds S1, S2 and S3 are lower to allow for this. On the other hand, if the SID signals were received perfectly, the channel is not affected by noise and under these conditions the thresholds S1, S2 and S3 can be higher. In practice, these thresholds are therefore determined as a function of the quality with which the SID signals are received.

The above approach ensures that the mobile telephone saves power and uses power for decoding only when the other party resumes speaking, which occurs at random since it is at the initiative of the other party.

In another example, the number of zero crossings of the quantized signal can be considered to assess received signal quality if the intention is not to start decoding. If this number is greater by a given amount, for example twice by the number of bits likely to be received, the signal can obviously be deemed to be noise. In this case, it is not essential to decode it. Reception by the switch 32 can therefore be started without starting decoding by the switch 33, which saves more energy.

In practice, all the measurements are performed by a program executed by the microprocessor 15 and stored beforehand in the memory 7.

What is claimed is:

1. A method of receiving voice signals in a mobile telephone wherein said voice signals are divided into time windows in successive frames, said method including the following ordered steps:

immediately after receiving a silence insertion descriptor (SED) signal, receiving first voice signals corresponding to a first time window, measuring the quality of the received signals, comparing the quality of the received signals to a first threshold to make a noise determination, and configuring the mobile telephone to not decode second voice signals corresponding to a second time window when the noise determination indicates noise, and to decode the second voice signals when the noise determination does not indicate noise.

2. A method according to claim 1, wherein said voice signals are decoded by a Viterbi decoder and said quality is determined by the Viterbi decoder.

3. A method according to claim 2, wherein the noise determination is obtained by comparing Viterbi decoding with quantization on more than two bits to Viterbi decoding on two bits.

4. A method according to claim 1, wherein the first threshold is determined as a function of a previous reception.

5. A method according to claim 4, further comprising:

when the noise determination does not indicate noise:
measuring the quality of the second voice signals,
using a quality of the second voice signals in a comparison with a second threshold to make a subsequent noise determination, and
configuring the mobile telephone to not decode third voice signals corresponding to a third time window when the subsequent noise determination indicates noise, and to decode the third voice signals when the subsequent noise determination does not indicate noise;

wherein a second threshold is greater than the first threshold; and wherein the comparison with the second threshold is based on the quality of the first and the second voice signals combined.

* * * * *